US012811975B2

(12) United States Patent
Fleming et al.

(10) Patent No.: US 12,811,975 B2
(45) Date of Patent: Nov. 24, 2026

(54) INCORPORATING SOFTWARE MATURITY IN ATTACK GRAPHS FOR ZERO-DAY MITIGATION

(71) Applicant: Cisco Technology, Inc., San Jose, CA (US)

(72) Inventors: Charles Fleming, Oxford, MS (US); Hendrikus G.P. Bosch, Amstelveen (NL); Ramana Rao V.R. Kompella, Foster City, CA (US); Gaowen Liu, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 18/931,792

(22) Filed: Oct. 30, 2024

(65) Prior Publication Data

US 2026/0122094 A1 Apr. 30, 2026

(51) Int. Cl.
*H04L 9/40* (2022.01)
*H04L 41/16* (2022.01)
*H04L 41/22* (2022.01)

(52) U.S. Cl.
CPC .......... *H04L 63/1433* (2013.01); *H04L 41/16* (2013.01); *H04L 41/22* (2013.01)

(58) Field of Classification Search
CPC ...... H04L 63/1433; H04L 41/16; H04L 41/22
See application file for complete search history.

(56) References Cited

U.S. PATENT DOCUMENTS 9,319,425 B2 * 4/2016 Giokas ................ H04L 63/1433
11,863,578 B1 * 1/2024 Speck ..................... G06N 5/022
12,309,188 B1 * 5/2025 Al Ghazo ........... H04L 63/1425
2009/0077666 A1 * 3/2009 Chen .................. G06Q 10/0631 726/25
2019/0379605 A1 * 12/2019 Pfister .................. G06N 3/0455
2020/0358798 A1 * 11/2020 Maylor ............... H04L 63/1433
2022/0046048 A1 * 2/2022 Koo .................... H04L 63/1433
2022/0263850 A1 * 8/2022 Colyandro, Jr. .... H04L 63/1433
2022/0345522 A1 * 10/2022 Kolar .................. H04L 67/1021
2023/0208870 A1 * 6/2023 Yellapragada .......... H04L 63/20 726/22
2023/0259635 A1 * 8/2023 Bao ....................... G06F 21/552 726/22
2024/0223602 A1 * 7/2024 Aoki ................... H04L 63/1466

OTHER PUBLICATIONS

Boudermine A., "A Dynamic Attack Graphs Based Approach for Impact Assessment of Vulnerabilities in Complex Computer Systems", Computer Science, Institut Polytechnique De Paris, Jan. 19, 2023, 180 Pages.

(Continued)

*Primary Examiner* — J. Brant Murphy
(74) *Attorney, Agent, or Firm* — Merchant & Gould P.C.; Kenneth J. Heywood

(57) ABSTRACT

In one implementation, a device obtains metrics regarding software executed in a computer network. The device determines, based on the metrics, a probability of the software representing a potential vulnerability. The device generates an attack graph that represents the potential vulnerability along a particular attack path. The device provides the attack graph for analysis.

20 Claims, 6 Drawing Sheets

(56) References Cited

OTHER PUBLICATIONS

Garg U., et al., “Empirical Analysis of Attack Graphs for Mitigating Critical Paths and Vulnerabilities”, Computers & Security, Aug. 2018, vol. 77, 26 Pages.

Guo Y., “A Review of Machine Learning-Based Zero-Day Attack Detection: Challenges and Future Directions”, Computer Communications, Jan. 15, 2023, vol. 198, 11 Pages.

Mezesova T., “Attack Path Difficulty—An Attack Graph-based Security Metric”, Tallinn University of Technology, Master thesis Jan. 2, 2017, ITC70LT, 144708IVCM, pp. 1-56.

Wikipedia: “Attack Tree”, Wikipedia the Free Encyclopedia, Retrieved from https://en.wikipedia.org/wiki/Attack_tree, Oct. 11, 2024, 4 Pages.

Wikipedia: “Zero-Day Vulnerability”, Wikipedia the Free Encyclopedia, Retrieved from https://en.wikipedia. org/wiki/Zero-day_vulnerability, Oct. 11, 2024, 6 Pages.

* cited by examiner

500

INCORPORATING SOFTWARE MATURITY IN ATTACK GRAPHS FOR ZERO-DAY MITIGATION

TECHNICAL FIELD

The present disclosure relates generally to incorporating software maturity in attack graphs for zero-day mitigation.

BACKGROUND

In the context of network and application security, attack graphs represent the possible paths that an attacker could take to conduct an attack on the system. Typically, in an attack graph, each node represents a vulnerability or action and an edge between nodes represents the attacker taking a given action or exploiting a certain vulnerability. Thus, a path along the attack graph from one node to another represents one potential way that the attacker could take to perform their attack. Attack graphs are often used for various purposes such as simulating attacks and addressing vulnerabilities (e.g., by applying software updates, making configuration changes, etc.).

A zero-day attack generally refers to an attack vector that take advantage of a previously unknown vulnerability/exploit. These types of attacks are known as "zero-day" attacks because the vulnerability/exploit was not known to the operator of the system until launch of the attack and, consequently, the operator has zero days until the vulnerability/exploit needs to be addressed. Because of this, attack graphs generally cannot be applied to prevent zero-day attacks, as the unknown vulnerability/exploit is not represented in the attack graph.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device obtains metrics regarding software executed in a computer network. The device determines, based on the metrics, a probability of the software representing a potential vulnerability. The device generates an attack graph that represents the potential vulnerability along a particular attack path. The device provides the attack graph for analysis.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
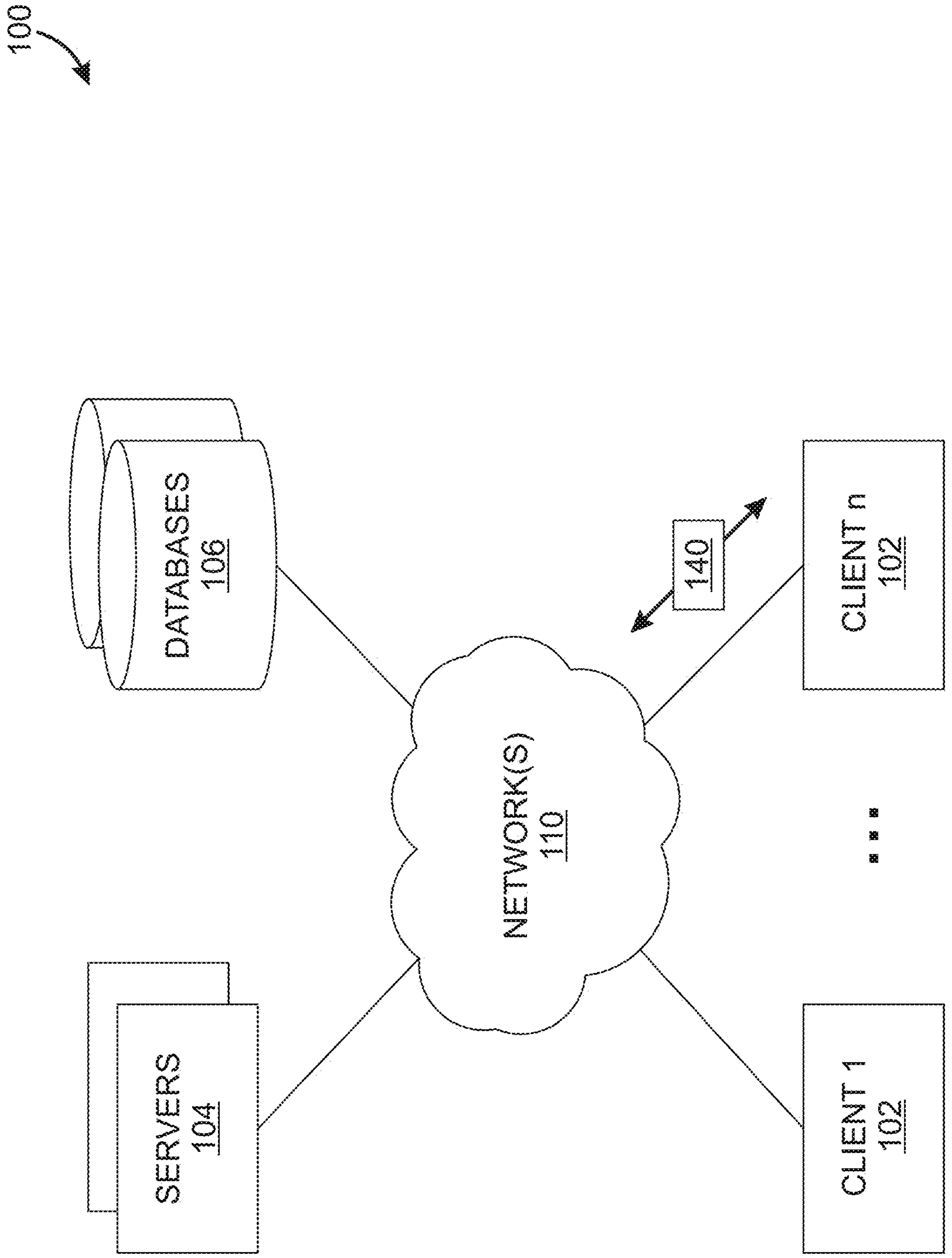
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device (s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
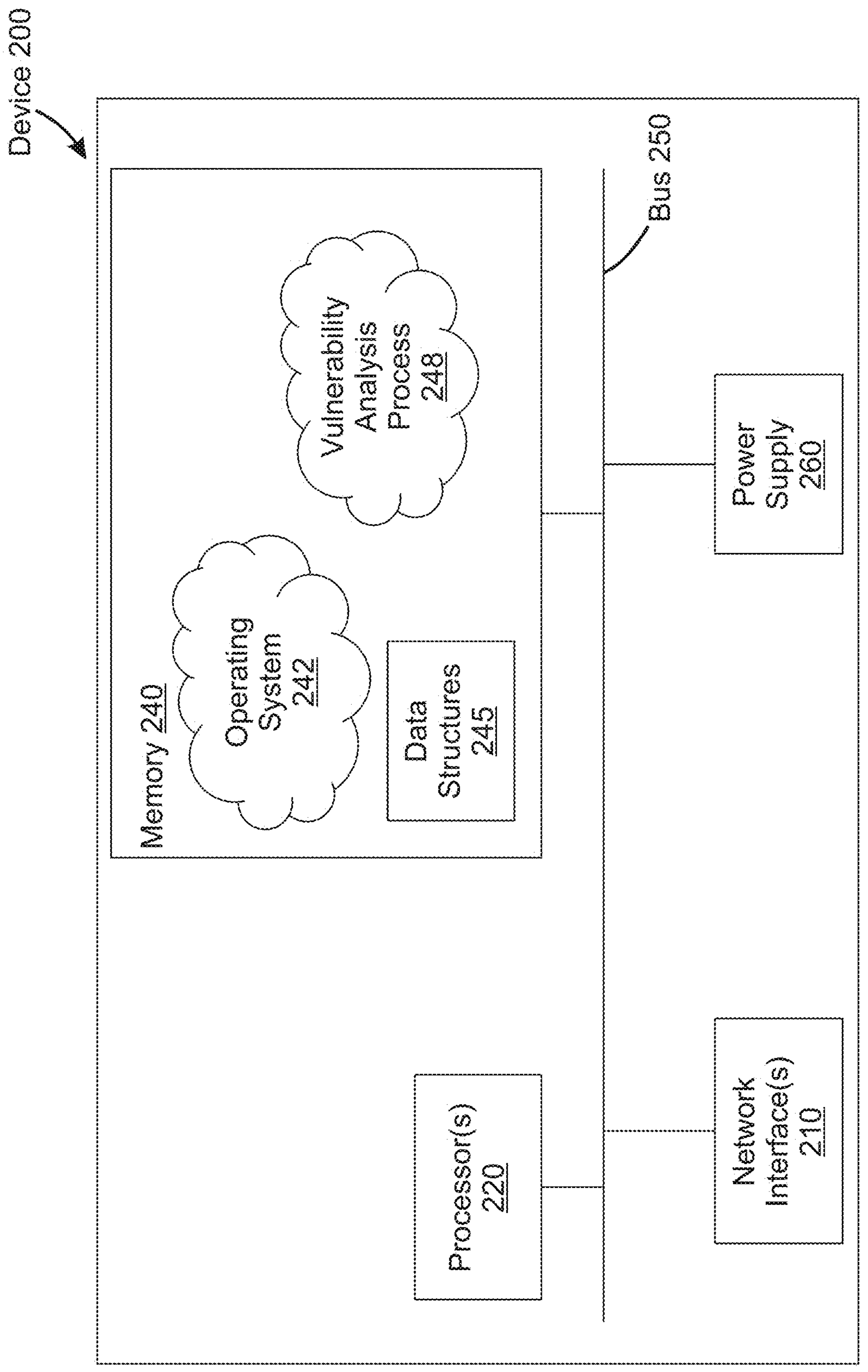
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative process such as vulnerability analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, vulnerability analysis process 248 may include computer executable instructions that, when executed by processor 220, cause device 200 to perform the techniques described herein. To do so, in some implementations, vulnerability analysis process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, vulnerability analysis process 248 may employ and/or be utilized to handle prompts to and/or access of one or more supervised, unsupervised, or semi-supervised machine learning models. Generally, supervised learning entails the use of a training set of data that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that vulnerability analysis process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, vulnerability analysis process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. Example generative approaches can include, but are not limited to, generative adversarial networks (GANs), foundation models such as large language models (LLMs), other transformer models, and the like.

As noted above, in the context of network and application security, attack graphs represent the possible paths that an attacker could take to conduct an attack on the system. Typically, in an attack graph, each node represents a vulnerability or action and an edge between nodes represents the attacker taking a given action or exploiting a certain vulnerability. Thus, a path along the attack graph from one node to another represents one potential way that the attacker could take to perform their attack. Attack graphs are often used for various purposes such as simulating attacks and addressing vulnerabilities (e.g., by applying software updates, making configuration changes, etc.).

Figure 3:
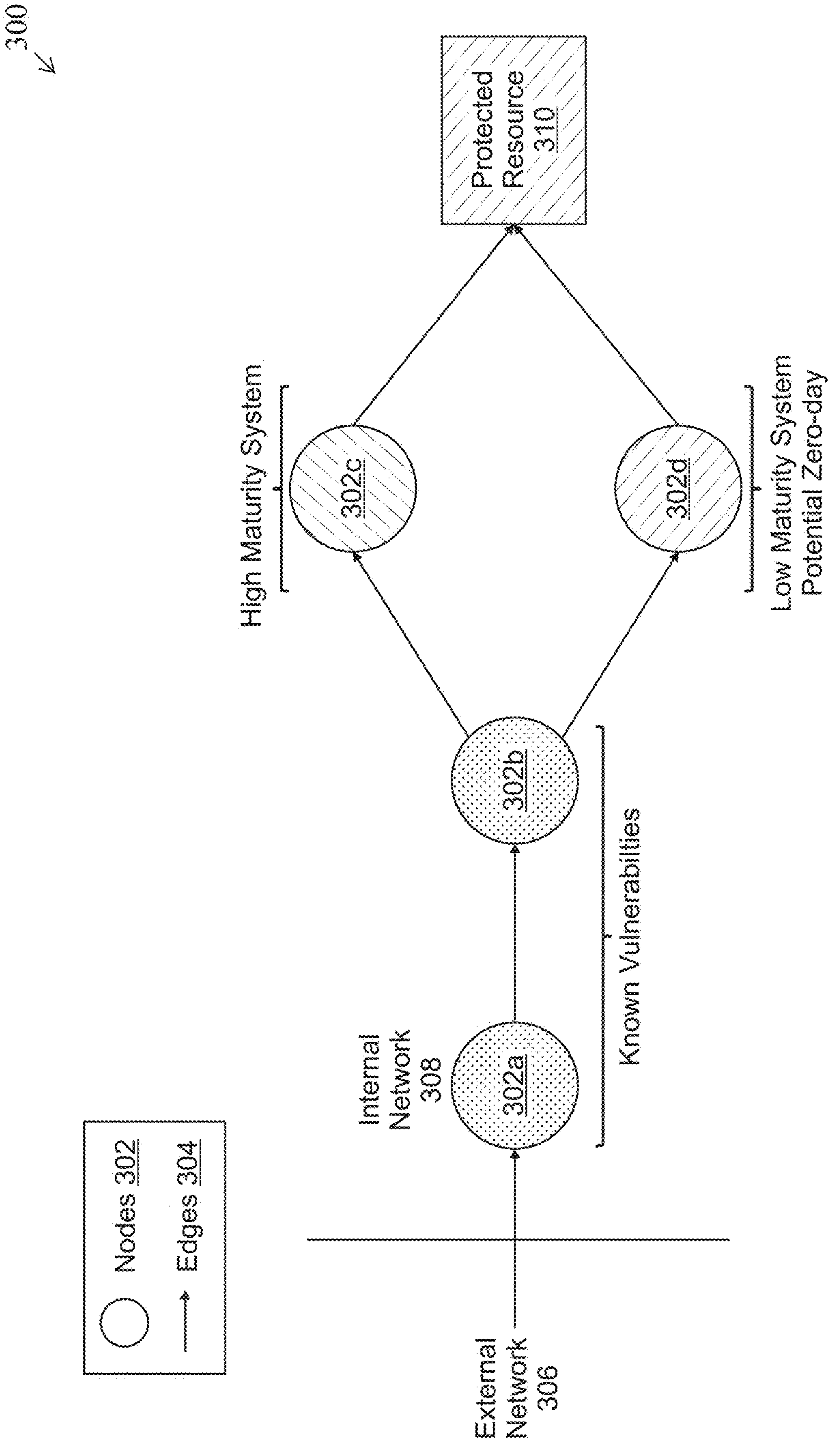
FIG. 3 illustrates an example attack graph for a computer network.

FIG. 3 illustrates an example attack graph 300 for a computer network, in various implementations. As shown, attack graph 300 may include nodes 302 interconnected by edges 304. In various implementations, each of nodes 302 may represent a particular exploit/vulnerability present within an internal network 308. In addition, edges 304 may interconnect nodes 302 and have an assigned direction to represent transitions between steps that an attacker may take towards an intended goal such as gaining access to protected resource 310.

By way of example, consider the case in which an attacker in an external network 306 launches an attack to gain access to protected resource 310 located within an internal network 308. To do so, the attacker may sequentially take advantage of a series of exploits/vulnerabilities, such as those represented by node **302*a* and node 302*b*** shown. In some implementations, these nodes may be generated based on defined Common Vulnerabilities and Exposures (CVEs), which are widely used across different network, application, and device security systems for various purposes.

Generally, a CVE is a standardized identifier for a software vulnerability or exposure, and it allows security professionals to reference and discuss exploits/vulnerabilities in a consistent manner. Based on the information provided in CVE entries, security experts create signatures that capture the specific patterns or characteristics associated with attempts to exploit the identified vulnerabilities. These signatures may include information such as payload content, packet structures, or sequences of actions typical of an exploitation attempt.

More specifically, CVEs are typically handled and managed through a combination of processes, tools, and collaboration between various stakeholders in the cybersecurity community. CVEs are assigned and managed by the MITRE Corporation's CVE Program, which assigns a unique identifier (CVE ID) to each reported vulnerability. This CVE ID serves as a standardized reference for the vulnerability across different platforms and databases. Once a vulnerability is reported, the CVE Program assigns a CVE ID and creates a corresponding entry in the CVE database. This entry includes detailed information about the vulnerability, such as its description, affected software versions, severity rating, Common Vulnerability Scoring System (CVSS) score, and any available references or patches.

As noted above, though, a zero-day attack generally refers to an attack vector that take advantage of a previously unknown vulnerability/exploit. These types of attacks are known as "zero-day" attacks because the vulnerability/exploit was not known to the operator of the system until launch of the attack and, consequently, the operator has zero days until the vulnerability/exploit needs to be addressed. Because of this, attack graphs generally cannot be applied to prevent zero-day attacks, as the unknown vulnerability/exploit is not represented in the attack graph.

Incorporating Software Maturity in Attack Graphs for Zero-day Mitigation

One observation herein is that, while it is impossible to represent all possible attack vectors for all possible zero-day attacks, the maturity of a system can be indicative of its potential to be subject to an unknown exploit/vulnerability. For instance, consider two systems in internal network 308: a first system (e.g., router, switch, other device, service, etc.) that has a high degree of software maturity and a second system that has a low degree of software maturity, represented by node **302*c* and node 302*d*, respectively. These systems both exist between that of the system associated with node 302*b* and protected resource 310. Thus, even though there are no known vulnerabilities associated with these, the techniques herein may still represent them in attack graph 300 based on their degrees of maturity. In doing so, this enhances attack graph 300** to also include attack paths for potential zero-day attacks.

Illustratively, the techniques described herein may be performed by hardware, software, and/or firmware, such as in accordance with vulnerability analysis process 248, which may include computer executable instructions executed by the processor 220 (or independent processor of interfaces 210) to perform functions relating to the techniques described herein.

Specifically, according to various implementations, a device obtains metrics regarding software executed in a computer network. The device determines, based on the metrics, a probability of the software representing a potential vulnerability. The device generates an attack graph that represents the potential vulnerability along a particular attack path. The device provides the attack graph for analysis.

Figure 4:
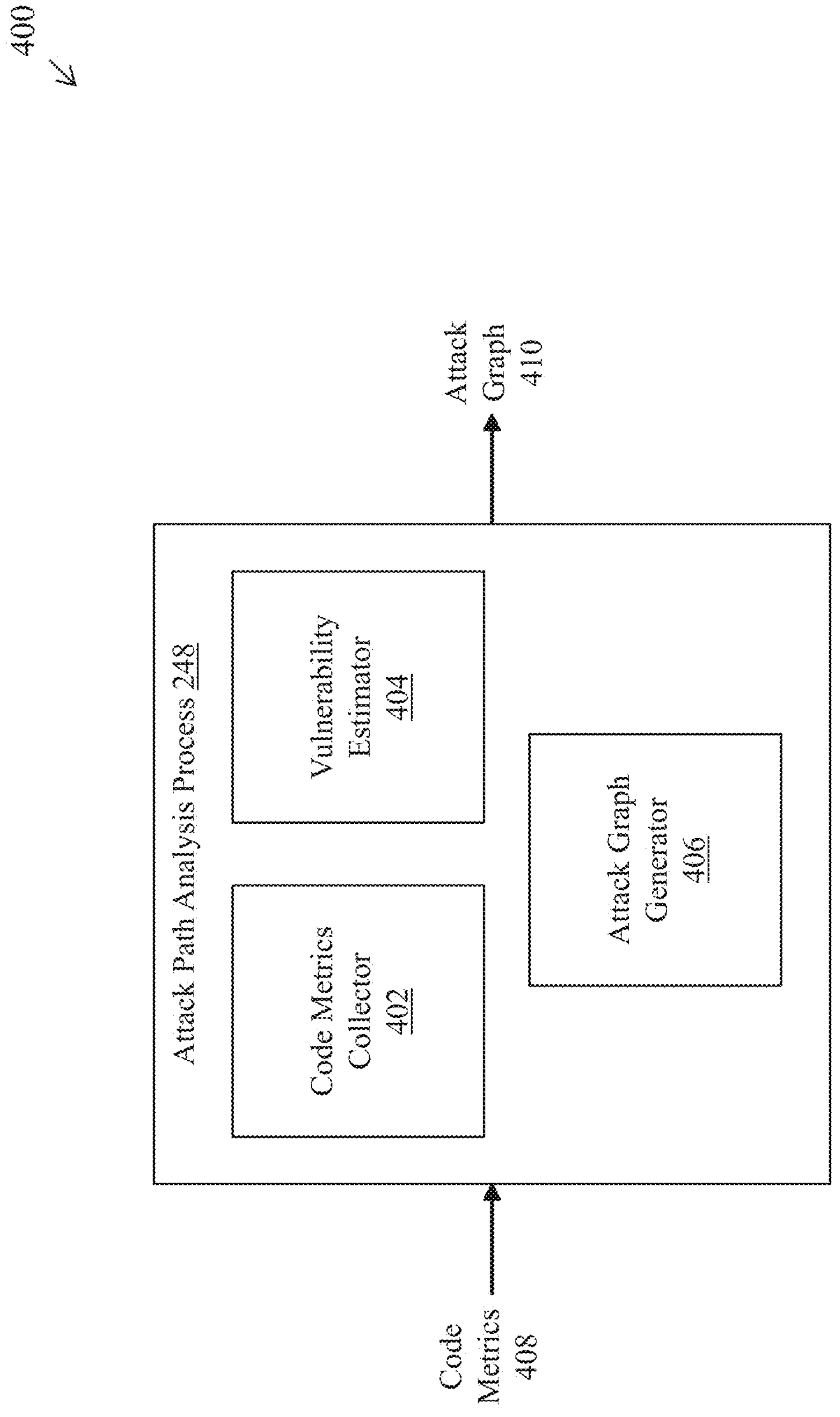
FIG. 4 illustrates an example architecture for incorporating software maturity in attack graphs for zero-day mitigation.

Operationally, FIG. 4 illustrates an example architecture 400 for incorporating software maturity in attack graphs for zero-day mitigation, according to various implementations. At the core of architecture 400 is vulnerability analysis process 248, which may be executed by specifically-configured device (e.g., device 200). As shown, vulnerability analysis process 248 may include any or all of the following components: code metrics collector 402, vulnerability estimator 404, and/or attack graph generator 406. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

During execution, code metrics collector 402 may be configured to obtain metrics regarding the various pieces of software executed in the system to be protected. In various implementations, code metrics collector 402 may do so on a pull or push basis. For instance, code metrics collector 402 may ingest code metrics 408 from a code development platform, a continuous integration/continuous delivery (CI/CD) pipeline, documentation, version release notes, software manifests, software bills of materials (SBOMs), or the like.

Generally, code metrics 408 may be indicative of the degree of maturity of the code/software. In turn, code metrics collector 402 may determine one or more maturity metrics for that piece of code/software, either directly from code metrics 408 or computed therefrom. Such maturity metrics may include, but are not limited to, any or all of the following:

- Age of the project associated with the code/software
- Average age of code lines of the code/software
- Average number of bugs associated with the code/software over one or more time periods (e.g., per month, etc.)
- Average number of vulnerabilities associated with the code/software over one or more time periods (e.g., per month, etc.)
- Etc.

In various implementations, vulnerability estimator 404 may use the one or more maturity metrics from code metrics collector 402 to estimate the probability of its corresponding code/software representing a potential vulnerability in the system to be protected (e.g., a computer network, a cloud environment, etc.). For instance, consider the case of an Infrastructure as Code (IaC) vulnerability. In such a case, if a piece of configuration/software is estimated as flawed, the configured cloud will be as well.

To do so, vulnerability estimator 404 may include one or more statistical models or machine learning/AI models trained to output a probability of there being a vulnerability based on the maturity metric(s). In another implementation, vulnerability estimator 404 may use heuristics to make the estimation. In a further implementation, vulnerability estimator 404 may also take into account one or more ratings regarding the code/software, such as those provided by programmers associated with the code/software (e.g., programmer-specified ratings regarding how sure they are that the code/software is immune to being exploited).

In various implementations, vulnerability estimator 404 may use a probability function to combine the vulnerability probabilities of multiple components of the system under scrutiny. For instance, say that vulnerability estimator 404 determines that there is a probability of 0.8 that a specific piece of code represents a vulnerability. Further, assume that if that vulnerability is exploited, it becomes straightforward for a malicious entity to then pull a given token (e.g., an Elastic Container Registry token, etc.) with a probability of 0.6. In a simple implementation, vulnerability estimator 404 may simply compute the product of the two probabilities. In another, vulnerability estimator 404 may use a probability function that takes the minimum of the probabilities. Of course, the specific function could vary, as desired.

Once vulnerability estimator 404 has computed the probabilities of vulnerabilities existing based on the maturity metrics from code metrics collector 402, attack graph generator 406 may use them to generate an attack graph 410. In various implementations, attack graph 410 may represent the potential vulnerabilities as additional nodes and include their associated probabilities from vulnerability estimator 404. As would be appreciated, known vulnerabilities have a probability of 1.0 and attack graph generator 406 may denote those nodes as such within attack graph 410.

In further implementations, attack graph generator 406 may also generate an attack graph by augmenting one or more existing attack graphs. For instance, say that vulnerability estimator 404 identifies a new potential vulnerability. In such a case, attack graph generator 406 may use a probability function, as described above, to augment the existing attack graph by combining its associated probabilities with that of the new probability.

In various implementations, attack graph generator 406 may provide attack graph 410 to any number of entities for further analysis. For instance, attack graph generator 406 may provide attack graph 410 to a user interface to allow a security expert to review the potential attack paths that it represents. In further cases, attack graph generator 406 may provide attack graph 410 to a service that helps to prioritize the application of remediation measures in the system to be protected. For example, such a service may triage the application of software upgrades, patches, or the like.

Figure 5:
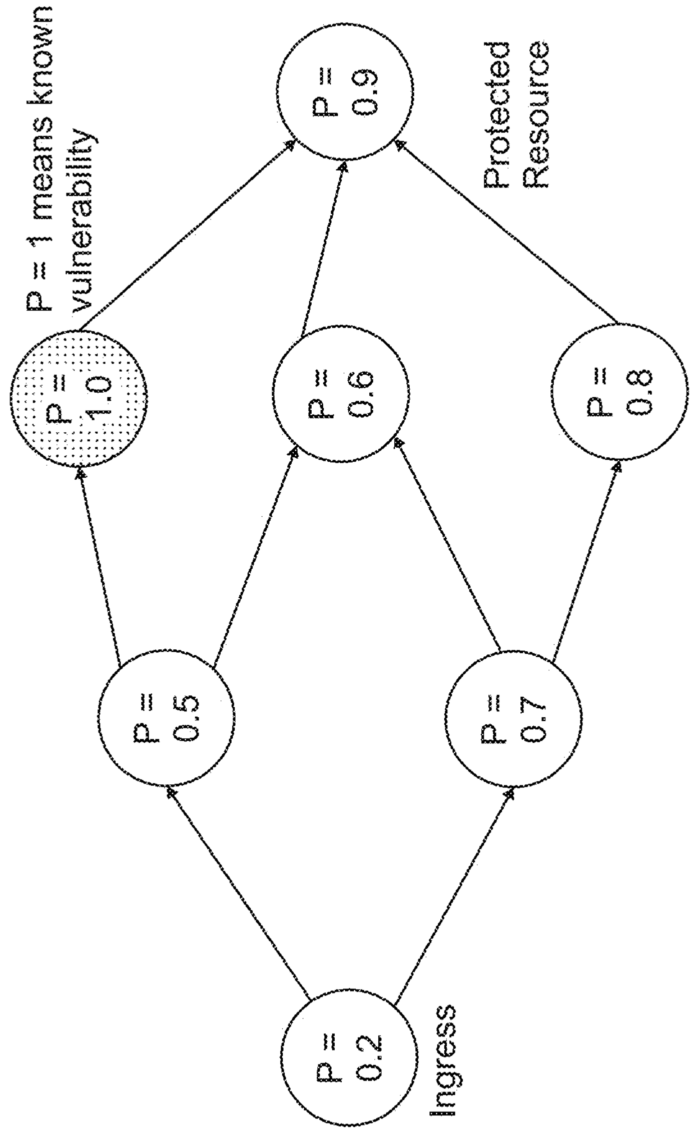
FIG. 5 illustrates an example attack graph incorporating software maturity for zero-day mitigation.

FIG. 5 illustrates an example attack graph 500 incorporating software maturity for zero-day mitigation, in various implementations. Here, attack graph generator 406 in FIG. 4 may generate attack graph 500 based on the maturity metrics associated with the various code/software executed in a computer network. As shown, each node in attack graph 500 may have an associated probability of representing a vulnerability, with known vulnerabilities having a probability of 1.0.

In various implementations, the joint probability along any given path in attack graph 500 may represent the most likely attack path that an attacker may use to access the protected resource shown.

Figure 6:
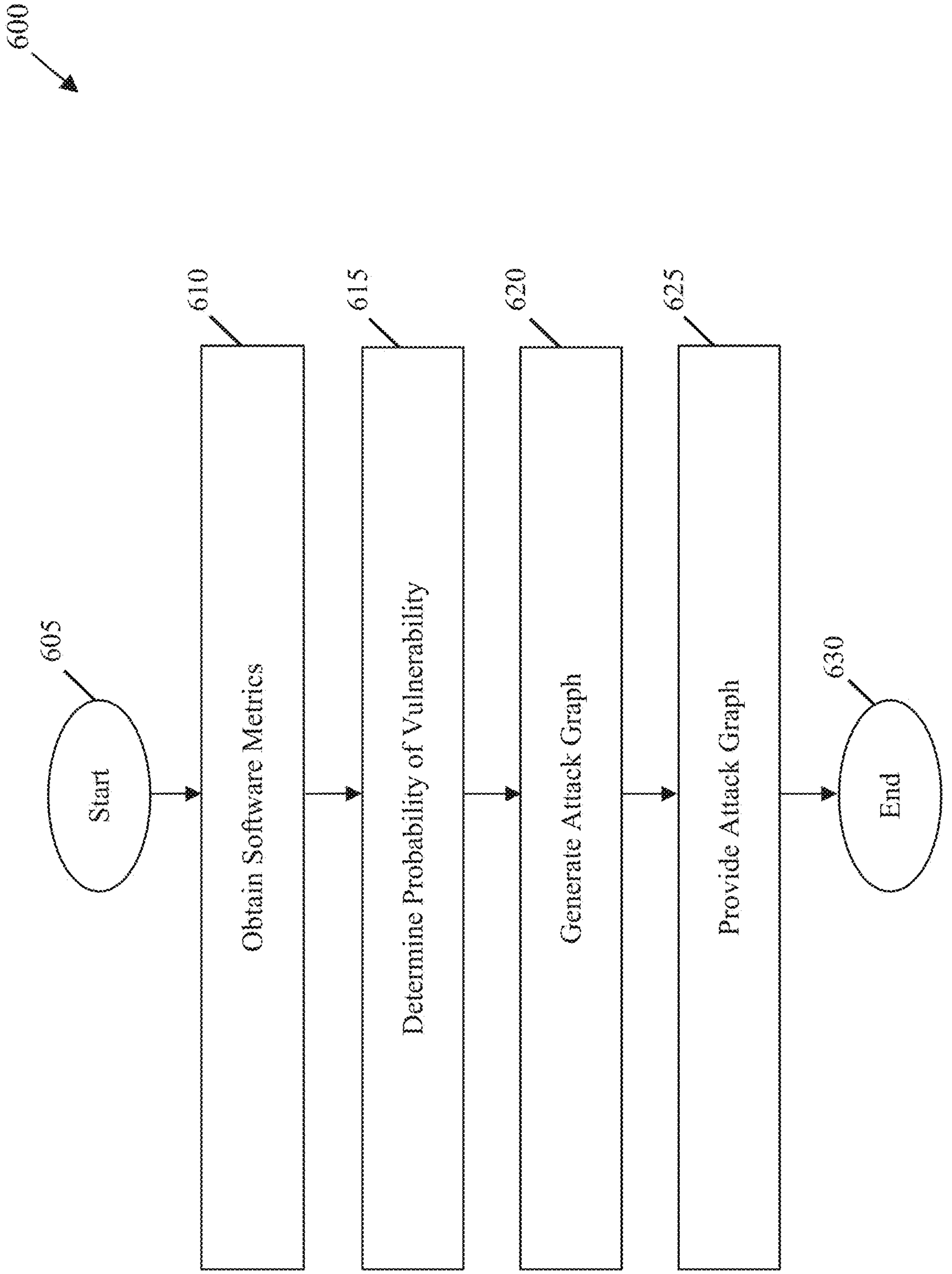
FIG. 6 illustrates an example simplified procedure for incorporating software maturity in attack graphs for zero-day mitigation.

FIG. 6 illustrates an example of a simplified procedure for incorporating software maturity in attack graphs for zero-day mitigation, in accordance with one or more implementations described herein. For example, a non-generic, specifically configured device (e.g., device 200), may perform procedure 600 (e.g., a method) by executing stored instructions (e.g., vulnerability analysis process 248). The procedure 600 may start at step 605, and continues to step 610, where, as described in greater detail above, the device (e.g., a networking device, a server, etc.) may obtain metrics regarding software executed in a computer network. In various implementations, the metrics are indicative of a measure of maturity of the software. For instance, in some instances, the measure of maturity of the software corresponds to one of: a project age associated with the software or an age metric associated with lines of the software. In further cases, the measure of maturity of the software is indicative of prior bugs or prior vulnerabilities associated with the software. In one implementation, the software is executed by a server, router, or switch in the computer network.

At step 615, as detailed above, the device may determine, based on the metrics, a probability of the software representing a potential vulnerability. For instance, the potential vulnerability may be at the level of the computer network, at the level of a cloud environment, or at the level of a particular application. In various implementations, the device uses a machine learning model to determine the probability of the software representing a potential vulnerability. In further implementations, the device determines the probability of the software representing a potential vulnerability based in part on a rating from a programmer associated with the software. In a further implementation, the device uses a probability function to combine the probability of the software representing a potential vulnerability with a probability of another piece of software representing another vulnerability.

At step 620, the device may generate an attack graph that represents the potential vulnerability along a particular attack path, as described in greater detail above. In some implementations, the particular attack path in the attack graph terminates at a node that represents a protected resource. In various implementations, the device may also compute a joint probability associated with the particular attack path based in part on the probability of the software representing a potential vulnerability.

At step 625, as detailed above, the device may provide the attack graph for analysis. In some implementations, the device provides the attack graph for display by a user interface. In further implementations, the attack graph is used to generate a recommendation with respect to the software. In one implementation, the device may provide an indication of the particular attack path to a user interface based in part on its associated joint probability.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for incorporating software maturity in attack graphs for zero-day mitigation, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

obtaining, by a device, metrics regarding software executed in a computer network, wherein the metrics are indicative of a measure of maturity of the software;

determining, by the device and based on the metrics, a probability of the software representing a potential vulnerability;

generating, by the device, an attack graph that represents the potential vulnerability along a particular attack path; and providing, by the device, the attack graph for analysis.

2. The method as in claim 1, wherein the device provides the attack graph for display by a user interface.

3. The method as in claim 1, wherein the particular attack path in the attack graph terminates at a node that represents a protected resource.

4. The method as in claim 1, wherein the device uses a machine learning model to determine the probability of the software representing the potential vulnerability.

5. The method as in claim 1, wherein the measure of maturity of the software corresponds to one of: a project age associated with the software or an age metric associated with lines of the software.

6. The method as in claim 1, wherein the measure of maturity of the software is indicative of prior bugs or prior vulnerabilities associated with the software.

7. The method as in claim 1, further comprising:

computing, by the device, a joint probability associated with the particular attack path based in part on the probability of the software representing the potential vulnerability.

8. The method as in claim 7, further comprising:

providing an indication of the particular attack path to a user interface based in part on its associated joint probability.

9. The method as in claim 1, wherein the potential vulnerability is a vulnerability in the computer network, in a cloud environment associated with the computer network, or an application executed in the computer network.

10. An apparatus, comprising:

one or more network interfaces;

a processor coupled to the one or more network interfaces and configured to execute one or more processes; and a memory configured to store a process that is executable by the processor, the process when executed configured to:

obtain metrics regarding software executed in a computer network;

determine, based on the metrics and using a machine learning model, a probability of the software representing a potential vulnerability;

generate an attack graph that represents the potential vulnerability along a particular attack path; and provide the attack graph for analysis.

11. The apparatus as in claim 10, wherein the apparatus provides the attack graph for display by a user interface.

12. The apparatus as in claim 10, wherein the particular attack path in the attack graph terminates at a node that represents a protected resource.

13. The apparatus as in claim 10, wherein the apparatus determines the probability of the software representing the potential vulnerability based in part on a rating from a programmer associated with the software.

14. The apparatus as in claim 10, wherein the metrics are indicative of a measure of maturity of the software.

15. The apparatus as in claim 14, wherein the measure of maturity of the software corresponds to one of: a project age associated with the software or an age metric associated with lines of the software.

16. The apparatus as in claim 14, wherein the measure of maturity of the software is indicative of prior bugs or prior vulnerabilities associated with the software.

17. The apparatus as in claim 10, wherein the process when executed is further configured to:

compute a joint probability associated with the particular attack path based in part on the probability of the software representing the potential vulnerability.

18. The apparatus as in claim 10, wherein the process when executed is further configured to:

use a probability function to combine the probability of the software representing the potential vulnerability with a probability of another piece of software representing another vulnerability.

19. A tangible, non-transitory, computer-readable medium storing program instructions that cause a device to execute a process comprising:

obtaining, by the device, metrics regarding software executed in a computer network;

determining, by the device and based on the metrics, a probability of the software representing a potential vulnerability;

generating, by the device, an attack graph that represents the potential vulnerability along a particular attack path;

computing, by the device, a joint probability associated with the particular attack path based in part on the probability of the software representing the potential vulnerability; and providing, by the device, the attack graph for analysis.

20. The tangible, non-transitory, computer-readable medium as in claim 19, wherein the process further comprises:

providing an indication of the particular attack path to a user interface based in part on its associated joint probability.

* * * * *